Feb. 5, 1957 J. YOUHOUSE 2,780,698
THERMOSTATIC SWITCH
Filed Sept. 3, 1954
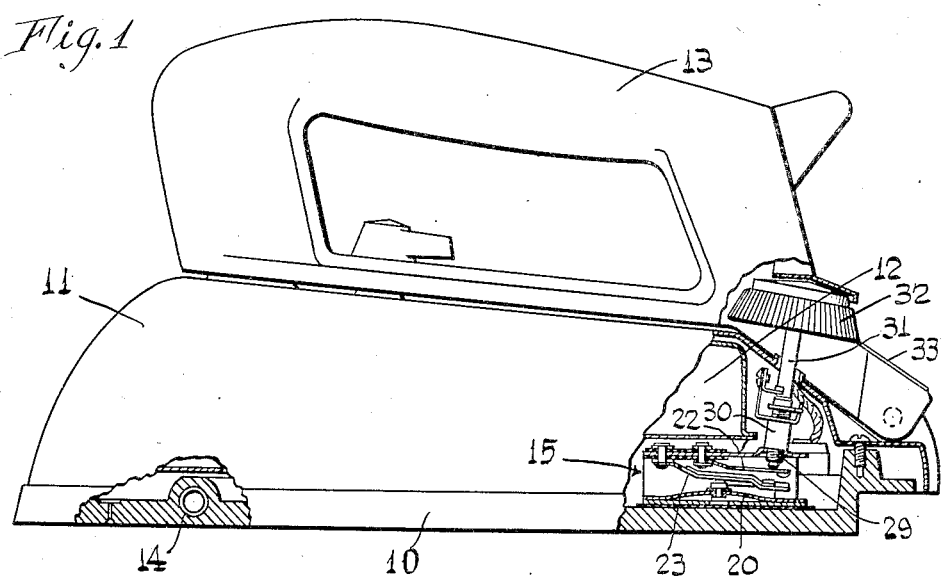
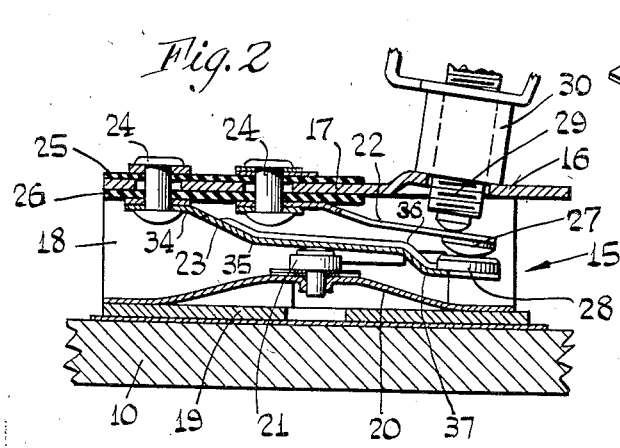
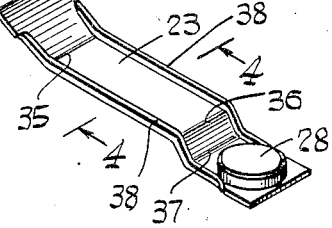
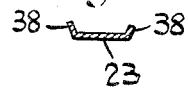
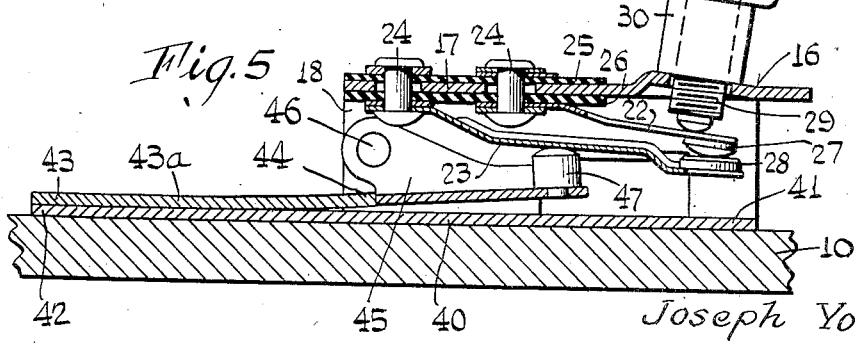
INVENTOR
Joseph Youhouse
BY
Johnson and Kline
ATTORNEYS

United States Patent Office 2,780,698
Patented Feb. 5, 1957

2,780,698

THERMOSTATIC SWITCH

Joseph Youhouse, Fairfield, Conn., assignor to Casco Products Corporation, Bridgeport, Conn., a corporation of Connecticut Application September 3, 1954, Serial No. 454,140

8 Claims. (Cl. 200—137)

This invention relates to thermostatic switches, and more particularly to switches for automatically controlling the circuits of electrically-heated appliances.

The invention is shown as incorporated in a domestic flatiron of the steam electric type; however it should be understood that the invention is not limited to the specific disclosure set forth herein, since it has utility in connection with other articles which will be readily apparent to those skilled in the art.

One type of thermostatic switch as commonly used in electric irons comprises a pair of flexible arms carrying cooperable contacts, one of said arms being adjustably positioned by an adjustment screw or calibration device and the other arm being automatically actuated by a heat-responsive member such as a strip of bimetal or the equivalent. In constructing such thermostats, consideration must be given to the space available for it to occupy, and preferably the thermostat should be as small and compact as possible, since users normally prefer the flatiron to be relatively small in size. Much of the space within the casing of the flatiron is occupied by the water reservoir or boiler, and user requirements also dictate that the amount of water which may be held at one filling be quite appreciable, thereby to enable a large amount of ironing to be done without continually refilling the iron.

In constructing such thermostatic switches for compactness, the contact-carrying arms are usually made flexible and arranged side-by-side, the movable or heat-actuated arm being provided with reverse bends to enable it to clear the mounting means for the other arm and to otherwise accommodate components of the thermostatic switch.

I have discovered that the provision of such bends in the actuated, contact-carrying arm has been the cause of defective operation and loss of accuracy in the calibration, since stresses to which the arm is subjected have had a tendency to cause straightening of the arm where it was initially bent or shaped. Thus the efficiency and reliability of these thermostatic switches have been impaired.

The present invention overcomes the above disadvantage of this prior thermostat construction, and an object of the invention is to provide an improved thermostatic switch which, while easily calibrated, will be reliable as regard its calibration throughout an extended period of use.

Another object of the invention is to provide an improved thermostatic switch as above set forth, which is extremely simple in its construction, small and compact, and economical to produce.

In accomplishing the above objects, I construct the bent contact-carrying arm which is actuated by the heat-responsive means so that it is stiffened, as by forming it transversely of its length with flanges or bent sections, such sections being in the vicinity of the bends of the arm which previously had a tendency to become straightened. The stiffened sections of the arm still remain somewhat flexible and yieldable, thereby to not interfere with proper operation of the heat-responsive means. However, the stiffening means has a stabilizing influence on the shape of the arm to such an extent that there is prevented any tendency for the arm to straighten where the bends are provided. Accordingly, the contact-carrying arm retains its original shape throughout its useful life, thereby resulting in great stability and reliability in the calibration of the thermostatic switch and in its operation.

Other features and advantages will hereinafter appear.

In the accompanying drawings:

Figure 1 is a side elevational view of a steam iron incorporating a thermostatic switch made in accordance with the invention, the switch and portions of the iron being shown in vertical section.

Fig. 2 is a detail, enlarged, showing the improved thermostatic switch in vertical section.

Fig. 3 is a perspective view of the heat-responsive contact arm of the switch shown in Figs. 1 and 2.

Fig. 4 is a transverse section taken on line 4—4 of Fig. 3.

Fig. 5 is a view like Fig. 2 but showing another form of heat-responsive means for actuating the contact arm.

The steam iron shown in Fig. 1 comprises a sole plate 10 carrying above it a casing 11 within which a boiler 12 for holding water is disposed. Attached to the top of the casing 11 is a handle structure 13 by which the iron may be manipulated. Within the sole plate 10 an electric heating coil 14 is carried, for the purpose of providing heat for the sole plate and boiler.

In accordance with the present invention I provide a novel and improved thermostatic switch 15 of small and compact construction within the casing 11, said switch being mounted on the sole plate 10 and to the rear and below the boiler 12 and being so constructed and arranged that it is reliable in its calibration and operation throughout an extended period of use.

The improved thermostatic switch 15 comprises a casing 16 in the form of an inverted channel, having a top wall 17 and side walls 18, the latter extending to and being fastened on the sole plate 10.

Within the casing 16 there is provided a heat-responsive means comprising a flat member or strip 19 of high expansion metal having secured to its ends a bowed strip 20 formed of metal which has low expansion characteristics. Carried by the central portion of the bowed member 20 is an insulating button 21 adapted to engage one of the contacts of the switch.

Mounted on the upper wall 17 of the casing are flexible contact arms 22 and 23, said arms being insulatedly secured in place by rivets 24 and insulating strips 25 and 26. The contact arms 22 and 23 respectively carry at their ends electrical contacts 27 and 28, and the arm 22 is engaged by an adjusting screw 29 mounted in a threaded collar 30 secured to the casing 16 whereby adjustment of the switch may be effected. The screw 29 has an upwardly extending shank 31 carrying a knob 32 by which the screw may be adjustably turned, said knob being associated with a scale 33 on the handle portion 13 of the iron whereby a calibration may be established for the switch, various settings of the knob 32 corresponding to different ranges of heats suitable for ironing different types of fabrics.

For the purpose of making the thermostatic switch small and compact whereby it will not require a great deal of space within the casing 11 of the iron, the contact arms 22 and 23 are arranged to extend alongside each other with the mounting rivets 24 disposed longitudinally on the upper wall 17 of the casing, and the heat-responsive means 19, 20 is disposed alongside of and below the contact arms 22 and 23, thereby to further improve the compact arrangement. In carrying out such arrangement, to provide proper clearances for one of the fastening rivets 24 and for the heat-responsive means 19, 20 and the button 21, the contact arm 23 is bent at a number of places along transverse lines, thereby to better accommodate it in the assembly without danger of short circuiting, contacting other components which might interfere with its proper movement, etc. The contact arm 23 has reverse bends 34 and 35 and also reverse bends 36 and 37, by which portions of the arm are offset laterally from other portions to effect the desired clearances.

From a consideration of Fig. 2 it will be observed that the action of the heat-responsive means 19, 20 and the button 21 may be such as to force the contact arm 23 upward, thereby bringing the lower electrical contact 28 in engagement with the upper electrical contact 27. Any continued movement of the heat-responsive means, resulting in continued upward movement of the button 21 will result in a flexure of the lower contact arm 23, inasmuch as the upper contact 27 is immovably backed up by the adjustment screw 29.

An increase in the temperature of the members 19 and 20 results in lowering of the insulating button 21, and lowering of the contact arm 23, and vice versa.

I have discovered that, as a consequence of continued operation of thermostatic switches when made as above set forth, there is a tendency for the lower contact arm 23 to depart from its given bent shape, and when such departure occurs it upsets the calibration of the thermostat and results in improper ironing temperatures for the various settings of the knob 32. Moreover, if the departure of the contact arm 23 from its original shape is sufficiently great it may result in undue arcing and even short circuiting of the components within the switch, rendering the switch inoperative. I have discovered that this deformation or departing of the lower contact arm 23 from its given bent shape may be virtually entirely eliminated in a very simple and effective manner, and have determined that when so eliminated there is cured or obviated the difficulty as regards variance in the calibration of the thermostat and improper operation thereof as above mentioned.

Referring to Figs. 3 and 4, I effect stability of shape of the lower contact arm 23 by forming the arm transversely of its length, as by the provision of upset edge flanges 38 to effect stiffening of the arm, particularly those portions in the vicinity in the bends 35, 36 and 37. It will be understood that the bend 34 which is adjacent the fulcrum of the arm is intended to yield or flex, and that such action has no adverse effect upon the positioning of the arm or shape of its effective length. The provision of the flanges 38 adjacent the bends 35, 36 and 37, however, effectively prevents straightening of the arm at the bends during its use in the thermostat, and it has been determined that an arm as thus constituted retains its original given shape throughout the useful life of the device. Thus, the initial calibration of the thermostatic switch is maintained, as well as the initial relative positions of the components, resulting in a thoroughly practical and reliable product. The provision of the side flanges 38, while seemingly simple, has solved a problem which at the outset was perplexing and baffling, since minute changes in the shape of the lower contact arm 23 were, while normally undetectable, sufficient to throw out the calibration of the thermostat very appreciably.

By the above organization I have provided an accurate and reliable thermostatic switch which is at the same time extremely simple and economical to manufacture, small in size and compact in its arrangement. The switch requires no more space than prior thermostatic switches of this type, yet is greatly superior in its performance to these prior switches.

Fig. 5 shows a modification of the invention. Components in Fig. 5 which are similar to those already described above have been given like characters. The difference between the switch of Fig. 5 and that of Fig. 2 resides in the heat-responsive actuating means. In Fig. 5 a high expansion strip 40 is secured at its rightmost end 41 to the casing 16. At its leftmost end 42 the strip 40 has attached to it one end 43 of a low expansion strip 43a whose other end 44 abuts a bell crank 45 carried by a pivot 46 mounted in the side walls 18 of the casing 16. The bell crank 45 has an insulating button 47 engaging the lower contact 23 for the purpose of actuating the same. Increases in the temperature of the strips 40 and 43 result in clockwise turning of the bell crank 45, and lowering of the contact arm 23, and vice versa.

Variations and modifications may be made within the scope of the claims and portions of the improvements may be used without others.

I claim:

1. A heat-responsive electric switch comprising a base; an arm formed from flexible stock, secured to and movable with respect to the base, said arm having a contact spaced from its securement to the base and being provided with a bend between the contact and said securement, a portion of the arm being formed transversely of its length to provide a stiffened section at said bend, thereby to minimize straightening of the arm at the bend; and heat-responsive means connected with the base, engaging said arm for moving the same to operatively shift the said contact.

2. The invention as defined in claim 1 in which the formation of the arm transversely of its length provides a channel section with opposite side flanges on the arm.

3. A heat-responsive electric switch comprising a base; an elongate arm of sheet metal attached at one end to the base, said arm being formed transversely of its length to stiffen it and having a contact carried by its other end, the stiffened portion of the arm being bent along a transverse line; a second contact carried by the base and engageable with the contact on the arm; and heat-responsive means connected with the base and engaging the stiffened portion of the arm to actuate the same for engaging and disengaging said contacts, said stiffened arm portion being resilient and tending to minimize straightening of the arm at the bend.

4. The invention as defined in claim 3 in which the heat-responsive means in cooling forces in the arm in a direction to engage the said contacts.

5. A heat-responsive electric switch comprising a base; an elongate arm of sheet metal attached at one end to the base, said arm being formed transversely of its length to stiffen it and having a contact carried by its other end, the stiffened portion of the arm having reverse bends along transverse lines; a second contact carried by the base and engageable with the contact on the arm; and heat-responsive means connected with the base and engaging the stiffened portion of the arm to actuate the same for engaging and disengaging said contacts, said stiffened arm portion being resilient and tending to minimize straightening of the arm at the bends.

6. The invention as defined in claim 5 in which the arm has pairs of reverse bends all but one of which is in the stiffened portion of the arm.

7. A heat-responsive electric switch comprising a base; a spring arm secured at one end to the base; a contact carried by the base; a cooperable contact carried by the free end of said spring arm; and heat-responsive means engaging said spring arm intermediate its ends for moving the arm to engage or to separate said contacts, said spring arm having a bend between its ends and being formed transversely of its length to provide a stiffened section in the vicinity of said bend, thereby to minimize straightening of the arm at the bend during use.

8. A heat-responsive electric switch comprising a base; a pair of spring arms secured at one end each to the base and extending side-by-side; cooperable contacts carried by the free ends of said spring arms; and heat-responsive means engaging one of said spring arms intermediate its ends for moving the arm closer to or further from said other arm to engage or to separate said contacts, said one spring arm having a bend between its ends for clearance purposes and being formed transversely of its length to provide a stiffened section in the vicinity of said bend, thereby to minimize straightening of the arm at the bend and resultant displacement of the contact.

References Cited in the file of this patent

UNITED STATES PATENTS

| | | |
|---|---|---|
| 2,496,917 | Poitras | Feb. 7, 1950 |
| 2,508,486 | Berlyn et al. | May 23, 1950 |
| 2,640,130 | Reingruber et al. | May 26, 1953 |
| 2,644,874 | Miller | July 7, 1953 |